V. P. TOMMINS.
FERN DISH OR DISPLAY RECEPTACLE.
APPLICATION FILED FEB. 7, 1908.
901,661. Patented Oct. 20, 1908.
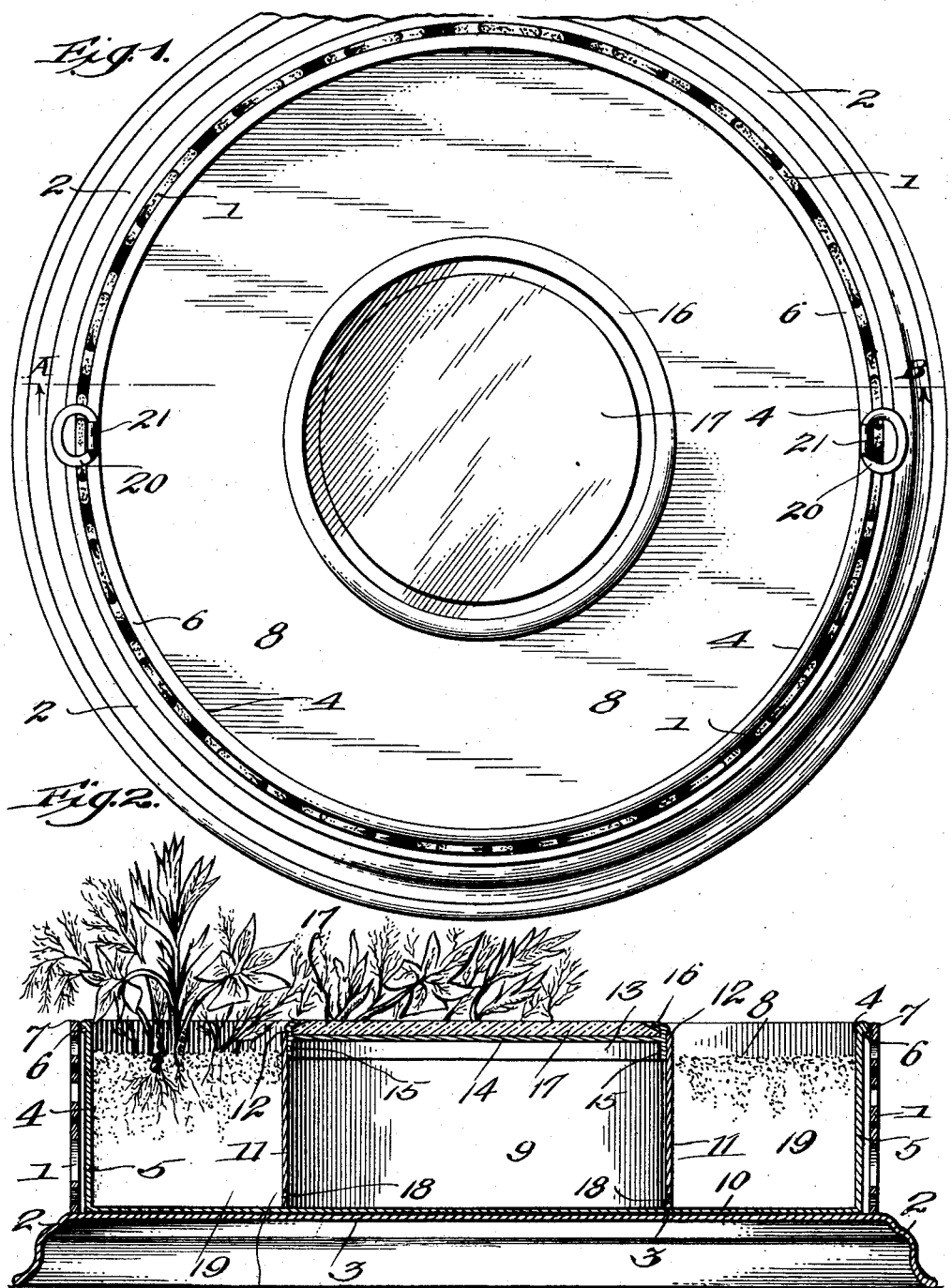

UNITED STATES PATENT OFFICE.

VINCENT P. TOMMINS, OF HOBOKEN, NEW JERSEY.

FERN-DISH OR DISPLAY-RECEPTACLE.

No. 901,661.　　　　Specification of Letters Patent.　　　Patented Oct. 20, 1908.

Application filed February 7, 1908. Serial No. 414,752.

*To all whom it may concern:*

Be it known that I, VINCENT P. TOMMINS, a citizen of the United States, residing at Hoboken, in the county of Hudson and State of New Jersey, have invented certain new and useful Improvements in Fern-Dishes or Display-Receptacles, of which the following is a specification.

The invention relates to improvements in fern dishes or display receptacles particularly applicable as a center-piece, fern or flower dish holder.

The invention has for its object the providing of an outer container and base and an inner receptacle provided with a circumferential space or compartment to receive either natural or artificial flowers and a central compartment provided with a lid having mounted therein a reflector adapted to represent water. The lid and reflector may be removed and the central compartment filled solid with soil similar to the outer circumferential compartment and natural or artificial flowers may cover the entire receiving area of the dish.

In the following is described in connection with the accompanying drawings one embodiment of the invention, the features thereof being more particularly pointed out hereinafter in the claims.

In the drawings Figure 1 is a plan view of the device, parts being broken away to more clearly illustrate the invention; and Fig. 2 is a cross sectional view on the line A—B of Fig. 1 illustrating the manner in which natural or artificial flowers may be placed within the receptacle and the central compartment thereof covered with the reflector means.

Similar numerals of reference indicate similar parts throughout the several views.

1 indicates an outer wall of any desirable design fastened in any suitable manner to base 2 of the receptacle. Outer wall 1 and base 2 may be made of any suitable material such as aluminum and other light weight metals having their surfaces covered with a lacquer to prevent tarnishing. Base 2 has preferably formed therewith a foundation structure 3 adapted to support inner receptacle 4. The wall 5 of inner receptacle 4 is approximately the same height as outer wall 1 and has formed on its upper outer periphery a beading 6 adapted to engage the edges 7 of outer wall 1. Inner receptacle 4 is divided into two separate compartments, an outer circumferential compartment 8 and a central compartment 9. Central compartment 9 is formed by means of mounting on the base structure 10 of inner receptacle 4 a cylindrical wall 11 open at its upper end as at 12. Said central compartment may have mounted thereon across its top a lid 13 comprising a base section 14 and a flange 15 adapted to engage the upper side wall 11 of the central compartment 9. Said lid 13 has mounted in beading 16 thereof a reflector or mirror 17, the object of the same being to provide means whereby when the outer circumferential compartment 8 is filled with soil and natural or artificial plants, lid 13 may be placed over compartment 9 and appear as though there was a small pool of water in the midst of said floral decorations.

Lid 13 may be removed from over the central compartment 9 and permit the placing within said compartment of a candelabrum, vase or other decorative object. Then again lid 13 may be removed and the inner compartment 9 may be filled solid with soil up to approximately edge 12 of the central compartment, permitting either natural or artificial flowers to be planted at regular intervals throughout the receiving space of the dish.

Inner compartment 9 may have formed in the wall 11 thereof, preferably at its lower edge thereof, a plurality of perforations 18 and the capacity of compartment 9 filled with water which would permit of a real pool of water amidst the flowers and at the same time permit the water to percolate through said perforations 18 and to be taken up by soil 19 in outer circumferential compartment 8. To set off the picturesque qualities of the dish an auxiliary base may be provided, such as the well known mirror base to reflect the sides and contents of a fern dish.

Inner receptacle 4 has suitably mounted on its upper outer edge or beading 6 handles 20 mounted in holders or bearings 21, the object of the same being to permit a person to remove the inner receptacle 4 and contents thereof without disturbing the outer supporting receptacle or dish.

The entire device as above described is preferably made of a light metallic substance provided with any suitable design for the dish holder and lacquered or plated so as to prevent corroding by water or tarnishing by any foreign substance.

The device as herein shown and described may be widely varied without departing from the spirit of the invention.

What I claim and desire to secure by Letters Patent of the United States is:—

1. A device of the character described comprising an outer holder, a base therefor, an inner receptacle divided into an outer circumferential compartment and a separate central compartment having mounted thereon a reflector.

2. A device of the character described including an outer holder, a base therefor, an inner receptacle divided into an outer receiving compartment and a central compartment having mounted on and supported by its wall thereof a lid having mounted therein a glass mirror adapted to act as a reflector.

3. A device of the character described including an outer receptacle, a base therefor, and an inner receptacle divided into an outer circumferential receiving compartment adapted to receive soil and decorative floral display, and a separate central compartment adapted to receive a decorative art object.

In testimony whereof I have hereunto signed my name in the presence of two subscribing witnesses.

VINCENT P. TOMMINS.

Witnesses:
 D. D. LEVY,
 GEORGE V. GILMORE.